Sept. 13, 1966 T. M. BAUM 3,272,499
MECHANISM FOR FEEDING BOX BLANKS
Filed Oct. 12, 1964 6 Sheets-Sheet 3
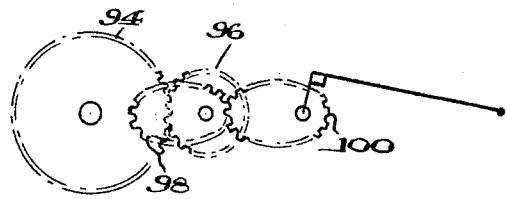
Fig. 5.
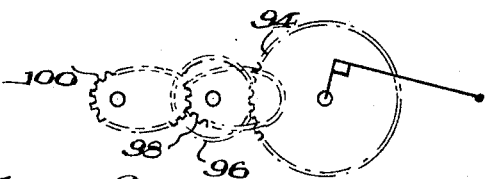
Fig. 6.
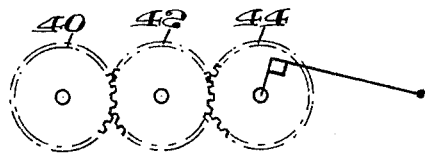
Fig. 7.
Fig. 13.
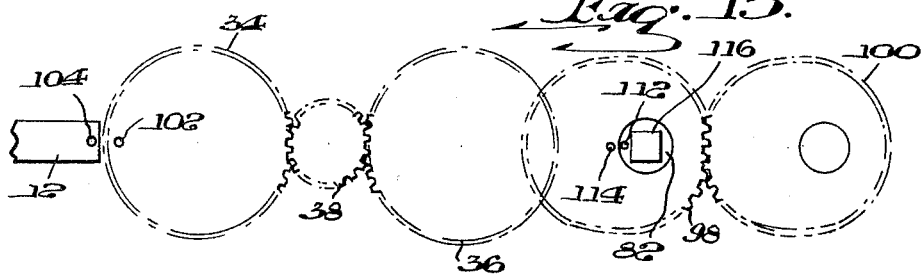
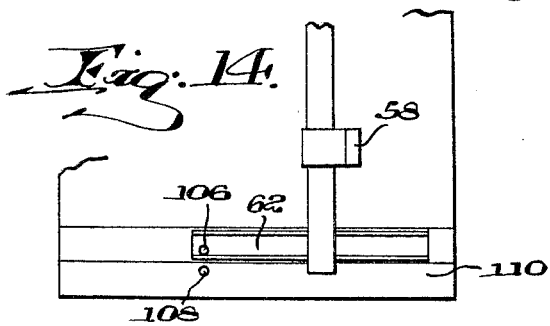
INVENTOR.
THEODORE M. BAUM.
BY Oscar B Brumback
his ATTORNEY.

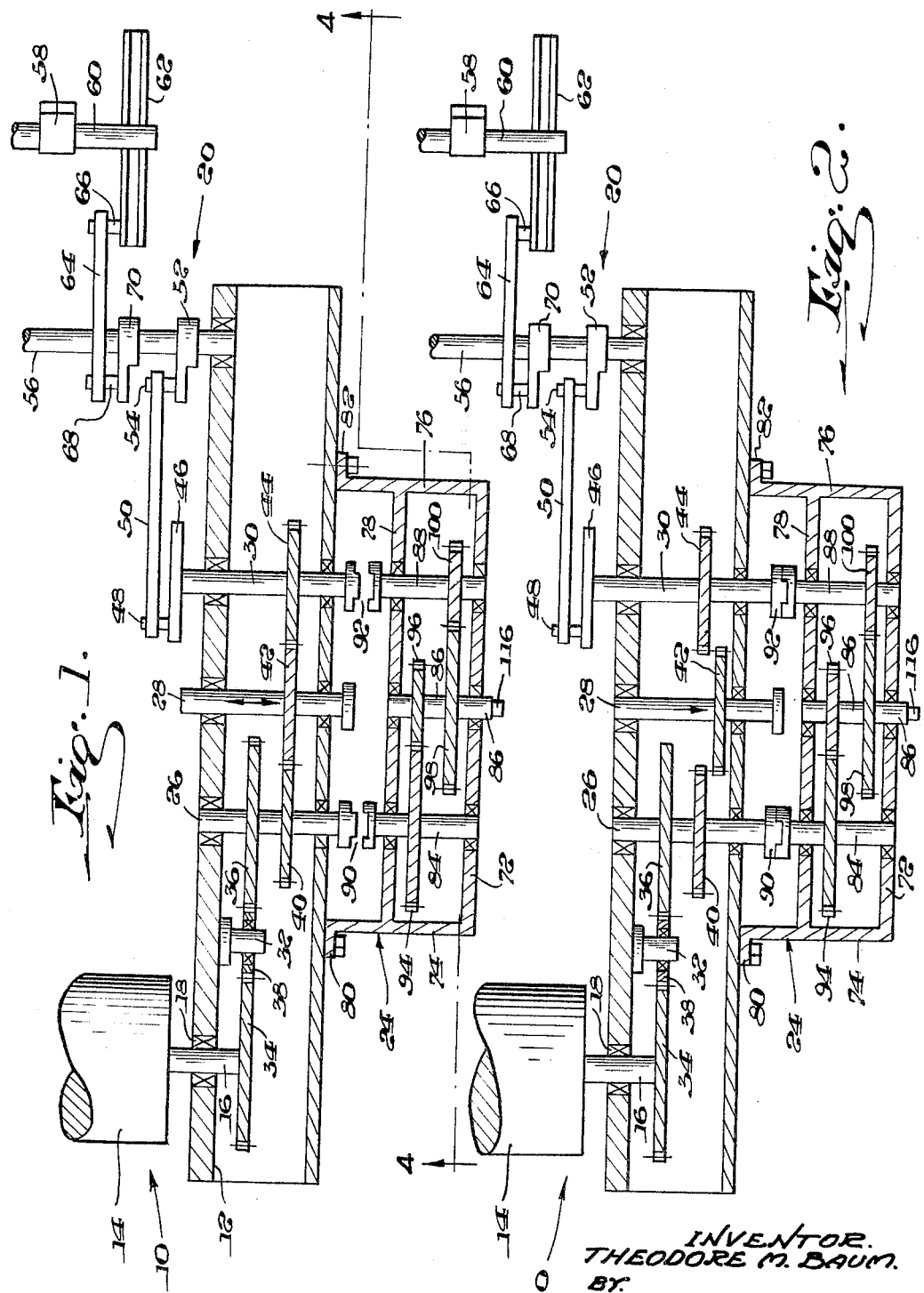

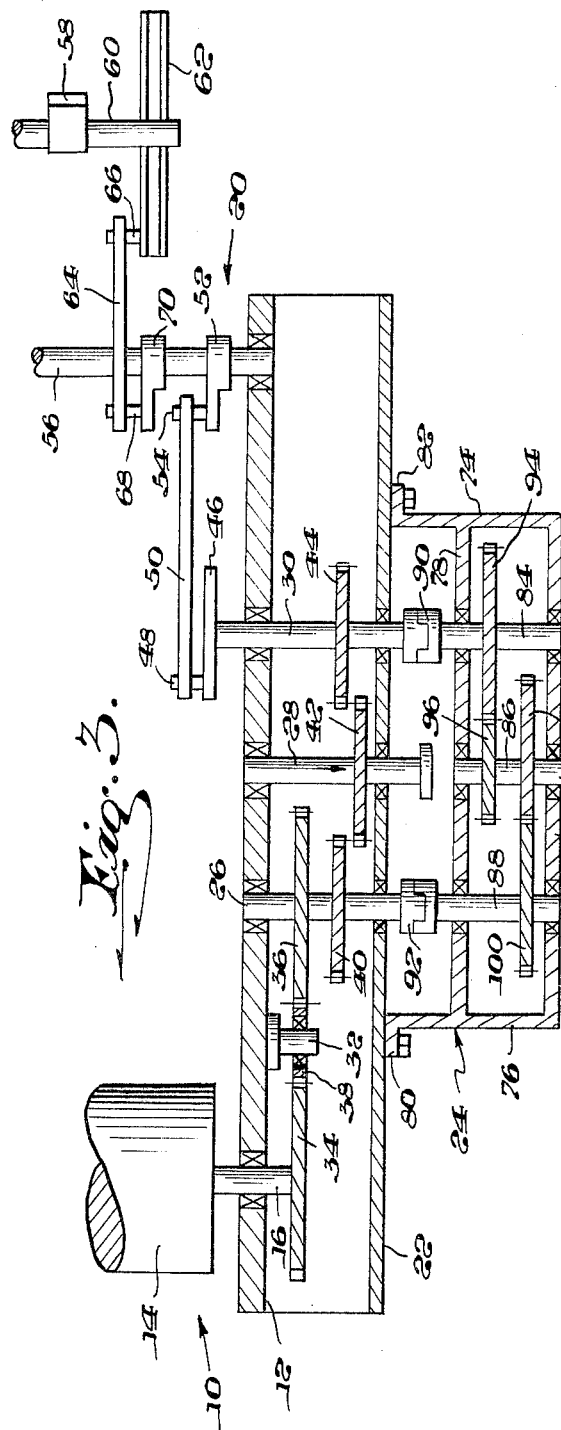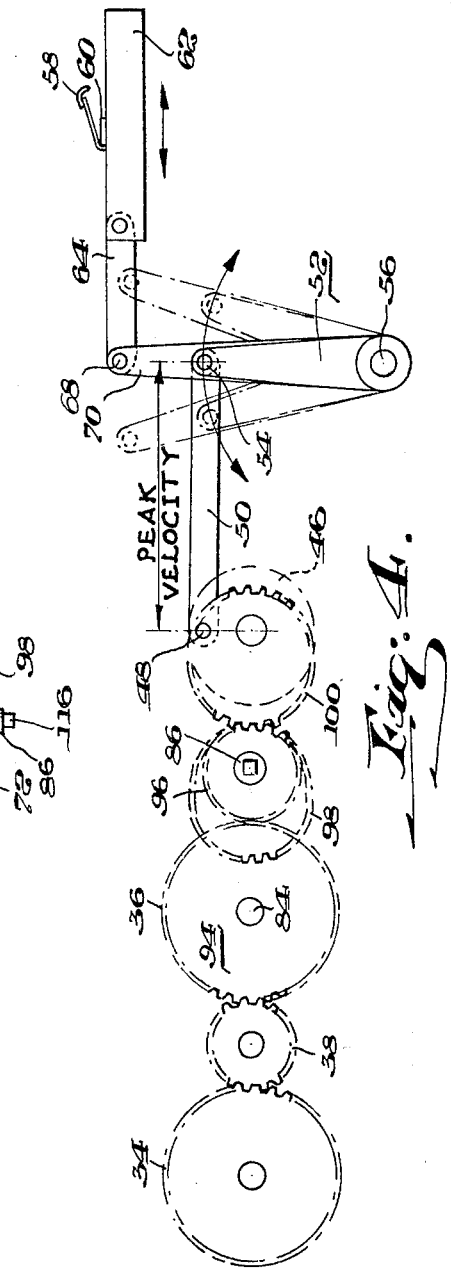

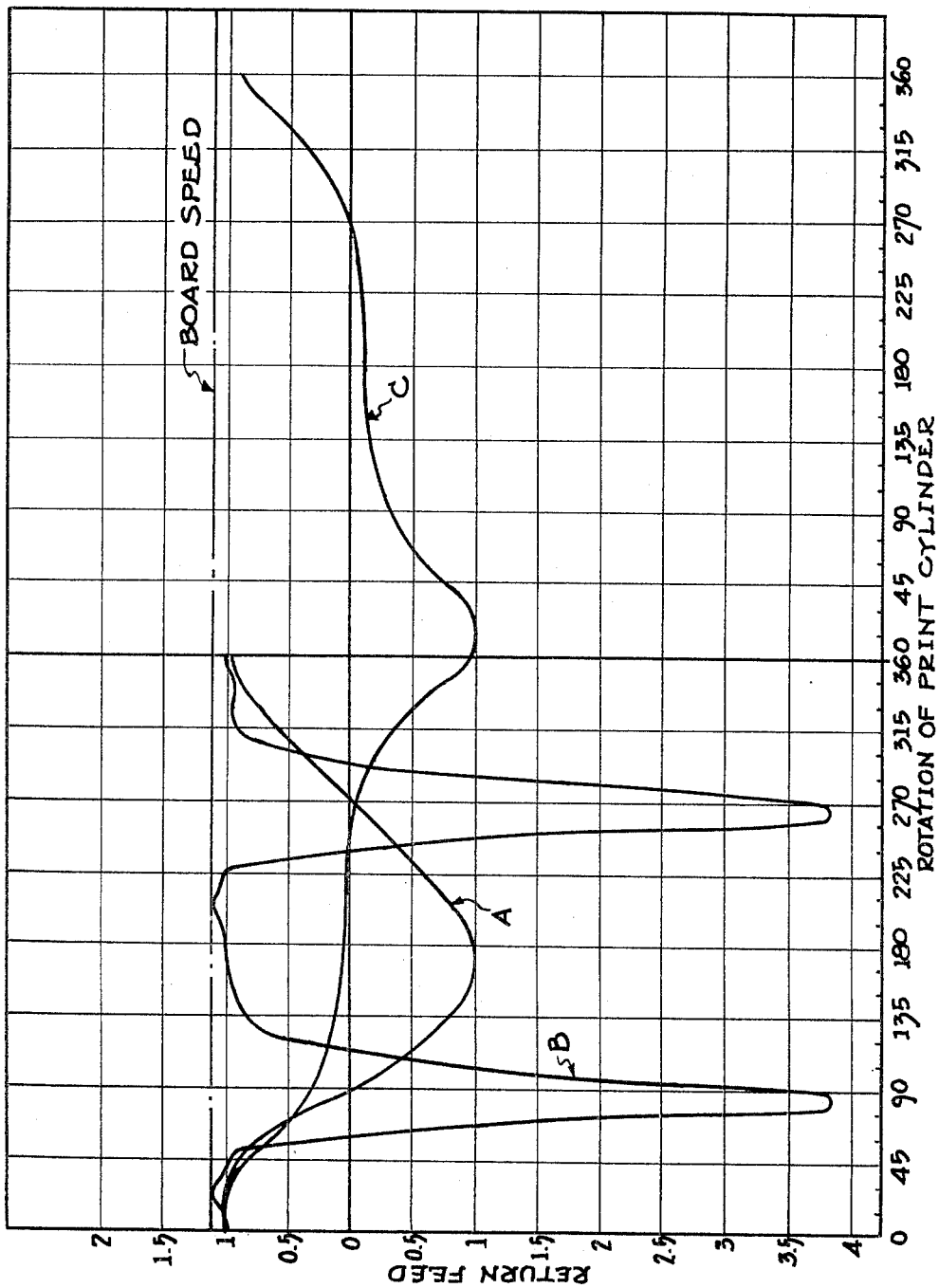

INVENTOR.
THEODORE M. BAUM.

BY Oscar B Brumback
his ATTORNEY

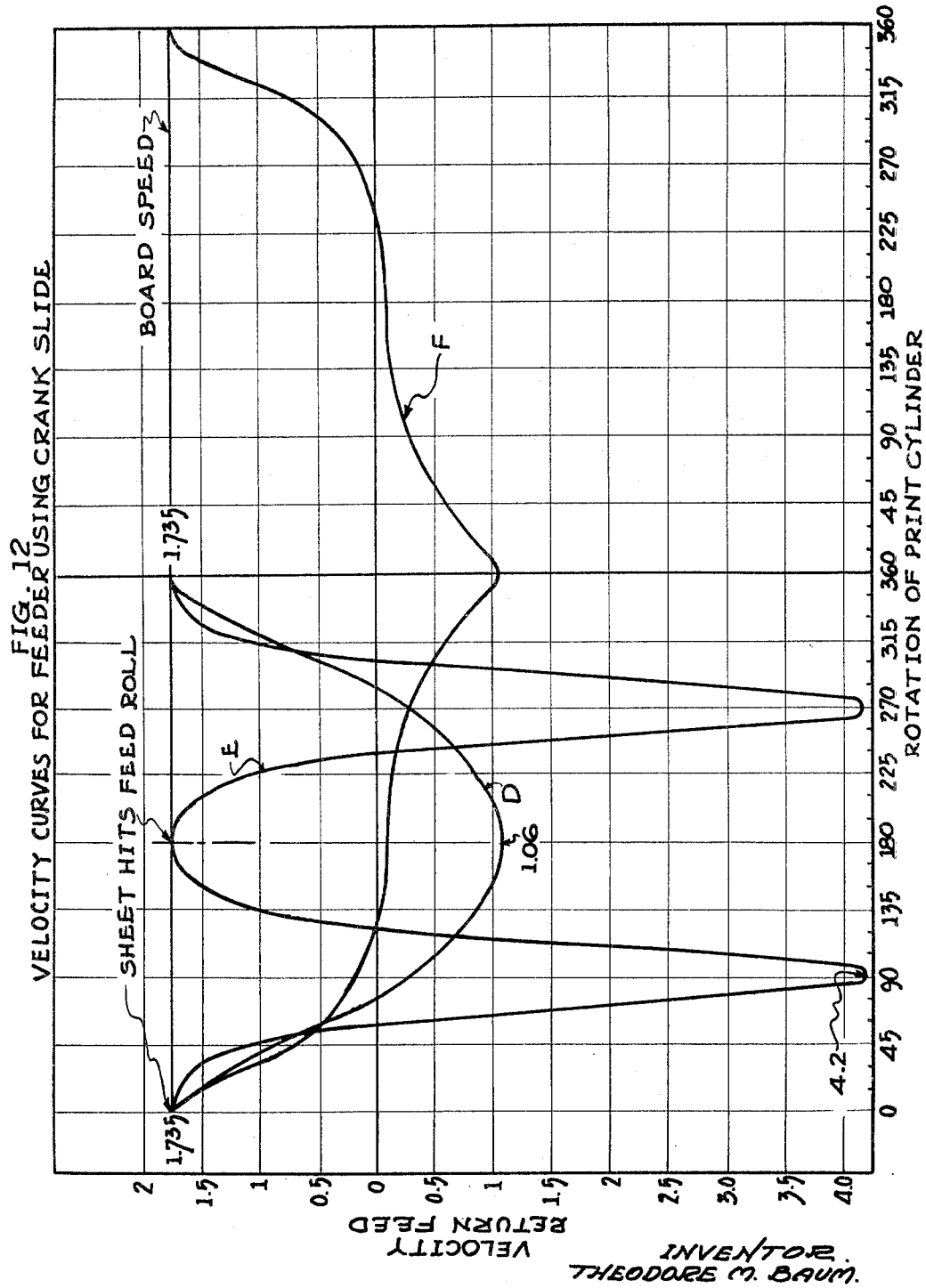

United States Patent Office 3,272,499
Patented Sept. 13, 1966

3,272,499
MECHANISM FOR FEEDING BOX BLANKS
Theodore M. Baum, Baltimore, Md., assignor to Koppers Company, Inc., a corporation of Delaware
Filed Oct. 12, 1964, Ser. No. 403,103
12 Claims. (Cl. 271—10)

This invention relates to a mechanism for feeding box blanks in a successive timed relationship, and more particularly to an adjustable mechanism for feeding box blanks that permits regular feeding, skip feeding, or double feeding.

In the processing of box blanks or corrugated paper board and the like, a mechanism known as a reciprocating feeder is utilized for feeding the blanks one at a time to adjacent machinery for subsequent operations that are performed upon the box blanks, such as printing, scoring, slotting and the like.

It is necessary for the reciprocating feeder to pick up a single box blank from a stack and advance the box blank toward the adjacent processing machinery in timed relation to the operation of the adjacent machinery. The box blank should, at the time it is introduced into the adjacent machinery have a linear velocity that is substantially equal to the peripheral velocity of the cylindrical members in the adjacent processing machinery.

Suitable gearing is provided for reciprocating the feeder in timed relation to the processing machinery. The gearing usually includes a crank gear that is revolved once for each revolution of a revolving portion of the adjacent machinery. For example, the crank gear completes one revolution for each revolution of a printing cylinder. A lever is pinned to the crank gear and is also attached to a lever mounted on a crankshaft to thereby impart a reciprocating motion to the shaft. This crankshaft is connected by means of other levers to slides on the bed of the printing press which are also arranged to reciprocate. Spring feeders are attached to the slides and are so arranged that they engage the bottom-most blank of a pile of blanks and feed this single bottom-most blank into the adjacent processesing machinery. The above described reciprocating feeder, commonly referred to as a Whitworth drive, has a velocity curve that approximates a sine wave. The spring feeders are so arranged that they engage the bottom-most blank at substantially zero velocity and accelerate the blank to the peripheral velocity of the printing cylinder. This peripheral velocity is also referred to as the board speed of the box blank. The board speed is the highest velocity which is imparted to the blank by the reciprocating feeder and is imparted at the time that the blank is engaged by a pair of pulling rolls that advance the blank into the adjacent processing machinery. The feeding of one blank for each revolution of the printing cylinder is known as regular feeding, and the crank gear revolves at the same revolutions per minute as the printing cylinder. Regular feeding is well-known in the art. As is disclosed in U.S. Patent No. 3,038,720, a mechanism has been devised for feeding one box blank for every two revolutions of the printing cylinder. This is known as skip feeding. The purpose of skip feeding is to permit feeding of a box blank whose length exceeds the circumference of the printing cylinder.

In certain applications it is necessary to feed blanks of a length that is less than the circumference of the printing cylinder. Where the blanks have a length of less than one-half the circumference of the printing cylinder, it would be possible by doubling the feeding capacity of the reciprocating feeder to reduce in half the time required to feed the short box blanks as compared to the time required to feed regular blanks. To accommodate the short blanks, modification of the printing cylinder could be made by providing two similar dies on the printing cylinder to print on each short blank as the cycles of the reciprocating feeder is increased to provide double feeding.

Briefly, the invention herein disclosed provides a reciprocating feeder that is mechanically connected to adjacent processing machinery and may be adjusted to feed box blanks at three different timed relationships with the adjacent machinery. The reciprocating feeder of the instant invention includes a primary transmission that mechanically connects the feeder to the adjacent processing machinery for regular feed of the box blanks. An auxiliary transmission is provided that is connected to portions of the main transmission through suitable clutching apparatus to provide either skip feed or a double feed of the box blanks. The auxiliary transmission includes a pair of meshing elliptical gears that advance the box blanks into the adjacent machinery at substantially the same velocity as the peripheral velocity of a rotating member in the adjacent machinery. This desired velocity of the box blanks is obtained during both skip feed and double feed.

Accordingly, the principal feature of this invention is to double the rate at which short blanks are fed into adjacent processing machinery.

Another feature of this invention is to provide a reciprocating feeder that is operable to feed two blanks into adjacent processing machinery for each revolution of a rotating member in the adjacent processing machinery.

A still further feature of this invention is to provide means for double feeding box blanks into adjacent processing machinery at substantially the same velocity as the peripheral velocity of a rotating member in the adjacent processing machinery.

Another feature of this invention is to provide a reciprocating feeder that is mechanically driven by a rotating member of adjacent processing machinery and adjustable to feed box blanks at a regular feed rate, a skip feed rate and a double feed rate.

This invention comprises a new and improved construction and combination of parts and their operating relation to each other which will be described more fully hereinafter and the novelty of which will be particularly pointed out and distinctly claimed.

In the drawings:

FIGURE 1 is a schematic plan view of the drive mechanism for the reciprocating feeder arranged for regular feeding.

FIGURE 2 is a schematic plan view similar to FIGURE 1 illustrating the gearing arrangement for double feeding.

FIGURE 3 is a schematic plan view similar to FIGURE 1 illustrating the gearing arrangement for skip feeding.

FIGURE 4 is a schematic view in elevation taken along the lines 4—4 of FIGURE 1 illustrating the positions of the elliptical gears and levers during the feeding operation.

FIGURES 5, 6 and 7 are schematic views in elevation showing the drive arrangements for the gears for double feeding, skip feeding and regular feeding respectively.

FIGURE 8 graphically illustrates the velocity curves for double feeding, skip feeding and regular feeding obtained by the gearing arrangements illustrated in FIGURES 5–7 respectively.

Figure 9:
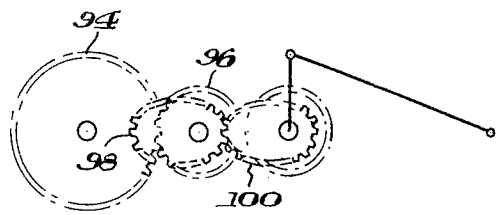
Figure 10:
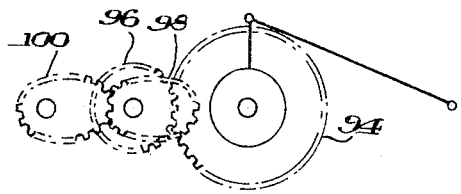
Figure 11:
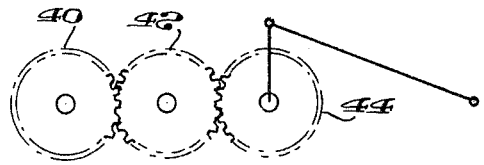

FIGURES 9, 10 and 11 are views in elevation showing the drive arrangements of the gears for double feeding, skip feeding and regular feeding when a crank slide is used.

FIGURE 12 is a graphic representation of the velocity curve for double feeding, skip feeding and regular feeding when a crank slide as illustrated in FIGURES 9, 10 and 11 is used.

FIGURES 13 and 14 are schematic illustrations of the match marks provided on certain of the gears for properly timing the reciprocating feeder.

Referring now more particularly to the drawings wherein like numerals of reference designate similar parts in each of the figures, there is illustrated schematically a printing machine generally designated by the numeral 10 that has a frame 12 in which a printing cylinder 14 is rotatably mounted. Suitable means, not shown, is provided for rotating the printing cylinder 14 at a preselected peripheral velocity. The printing cylinder 14 has a shaft 16 suitably mounted in bearings 18 in the frame 12.

The reciprocating feeder generally designated by the numeral 20 has a main transmission suitably supported in a subframe 22 carried by the machine frame 12. An auxiliary transmission for the feeder 20 has a housing 24 that is suitably secured to the subframe 22. The housing 24 may be secured by bolts and the like and is preferably symmetrical so that it may be rotated 180° and be readily resecured to the subframe 22, as will be later discussed.

Shafts 26, 28 and 30 of the main transmission are rotatably supported by both the machine frame 12 and the subframe 22. A stub shaft 32 is also supported by the machine frame 12. A drive gear 34 is secured to and rotatable with the printing cylinder shaft 16. The shaft 26, referred to as an input shaft, has secured thereto for rotation therewith gear 36 that is the same size as gear 34. An idler gear 38 rotatably mounted on the stub shaft 32 drivingly connects gear 36 with gear 34 so that shaft 26 rotates at the same r.p.m. as the printing cylinder shaft 16. The shaft 26 has another gear 40 secured thereto for rotation therewith. The gear 40 meshes with a gear 42 secured to idler shaft 28. The gear 42 on shaft 28 in turn meshes with a gear 44 secured to shaft 30, referred to as an output shaft. Thus, drive is transmitted from the printing cylinder shaft 16 through gears 34, 38, 36, 40, 42 and 44 to output shaft 30. The gears 40 and 44 are preferably the same size so that gear 44 will make one revolution for each revolution of gear 40. The above described gearing arrangement provides for the rotation of shaft 30 at the same frequency or revolutions per minute as printing cylinder shaft 16 and input shaft 26. Throughout this specification the term "frequency" will be used to designate the revolutions a shaft or other rotatable or reciprocating member revolves or reciprocates in a given period of time.

A crank drive 46 is secured to an end of the shaft 30 within the frame 12 for rotation with the shaft 30. The crank drive 46 has a laterally extending pin 48 which is connected to a link member 50. A lever 52 (FIG. 4) is connected to the other end of a link member 50 by a laterally extending pin 54. The lever 52 is secured to and oscillatable with a crankshaft 56 that is, in turn, rotatably supported in the machine frame 12. The lever 52 is arranged to reciprocate the crankshaft 56 through a preselected angle at a preselected angular velocity that is dependent upon the angular velocity of the printing cylinder 14.

Spring feeders 58 (only one shown) are connected to the crankshaft 56 through a laterally extending spring feeder bar 60 that is secured to a slide member 62. The slide member 62 is connected to the crankshaft 56 through a link 64 and pins 66 and 68. The pin 68 extends laterally from a lever 70 that is secured to crankshaft 56 in a manner similar to lever 52. The spring feeders 58 are mechanically connected to the gear 36 through a previously described crank mechanism, and with this arrangement the spring feeder and a box blank secured thereto will be advanced with each revolution of the gear 36 at a velocity corresponding to the velocity curve designated by the letter A in FIGURE 8. The velocity curve A in FIGURE 8 is sinusoidal in shape and designates a desired velocity curve for the regular feeding of box blanks. The peak velocity of the box blank is substantially equal to the peripheral velocity of the printing cylinder 14. At peak velocity a pair of pull rolls (not shown) frictionally engage the box blank and serve to continue the feeding of the box blanks at this peak velocity toward the printing roll.

The auxiliary transmission rotatably supported within housing 24 is operable, when connected to portions of the main transmission, to actuate the spring feeder 58 to double feed and skip feed the box blanks. The housing 24 has a side wall 72, a front wall 74, a rear wall 76 and an intermediate wall 78. The front and rear walls 74 and 76 have flanged end portions 80 and 82 by which the housing 24 is secured to the subframe 22. Rotatably supported within the housing 24 are shafts 84, 86 and 88. The shafts 84 and 86 have suitable clutch devices 90 and 92 secured to their end portions adjacent shafts 26 and 30, as illustrated in FIGURE 1. The clutch mechanisms 90 and 92 are arranged to engage respective shafts 84 and 88 to shafts 26 and 30 to provide the hereinafter described drive. A gear 94 is nonrotatably secured to the shaft 84 for rotation therewith and meshes with a gear 96 that is secured to shaft 86. An elliptical gear 98 is secured to shaft 86 for rotation therewith and also meshes with an elliptical gear 100 secured to shaft 88.

The gears 98 and 100 are elliptical and have the same number of teeth so that when gear 98 makes one revolution, gear 100 makes one revolution. There is, however, a 2:1 ratio between gears 94 and 96. This results in shaft 86 making twice the number of revolutions as shaft 84. The gears 98 and 100, because of their elliptical shape have a variable velocity ratio throughout the revolution and are so positioned on the respective shafts 86 and 88 that when the crank 56 is passing through the point of peak velocity, as is illustrated in FIGURE 4, the velocity ratio of the elliptical gears 98 and 100 is 1:2 thereby halving the doubled velocity induced by gears 94 and 96, so that the output velocity of the crank 56 at the peak velocity is equal to the velocity obtained by using the regular feed gears in the regular feed cycle.

The arrangement of the gearing and shafting for accomplishing double or 2:1 feeding is illustrated in FIGURE 2. The shaft is moved in the direction of the arrow on shaft 28 in FIGURE 2 to disengage gear 42 from gears 40 and 44. The disengaging of gear 42 disengages the gearing in the main transmission for the regular feed previously described. Clutches 90 and 92 frictionally engage the auxiliary transmission in housing 24 to portions of the main transmission by engaging the shafts 84 and 88 to shafts 26 and 30. With this arrangement rotation of shaft 26 is transmitted through clutch 90 to shaft 84 and the rotation of shaft 88 is transmitted through clutch 92 to shaft 30 and thence through the crankshaft 46 and the spring feeder 58. Because of the 2:1 ratio between gears 94 and 96 crankshaft 46 makes two revolutions of gear 36 in the main transmission. The peak velocity of crankshaft 46 during the two revolutions for each revolution of gear 36 is the same as the peak velocity obtained by crankshaft 46 when it is revolved only once for each revolution of gear 36. The desired peak velocity is obtained by the arrangement of the elliptical gears 98 and 100. This results in a double rate of feed of the box blanks at the desired velocity so that although two blanks are fed for each revolution of the gear 36 the blanks reach board speed or the desired velocity when they are frictionally engaged by the pinch rolls and fed to the printing cylinder 14. This desired velocity prevents the box blanks from skewing, slipping or jamming when fed to the printing cylinder. In FIGURE 8 curve B is the velocity curve for the double feed previously described.

FIGURE 3 indicates the arrangement of the auxiliary transmission within the housing 24 for skip feed wherein the printing cylinder 14 makes two revolutions for each box blank fed thereto by the reciprocating mechanism 20. The shaft 28 in the main transmission is moved longitudinally to disengage gear 42 from gears 40 and 44. The housing 24 is rotated 180° so that rear wall 76 now is adjacent to the printing cylinder 14. When FIGURE 3 is compared with FIGURES 1 and 2, the rotation of the housing 24 is apparent. The shaft 88 having elliptical gear 100 secured thereto is frictionally engaged through clutch 92 to shaft 26. Similarly the shaft 84 with gear 94 secured thereto is frictionally engaged through clutch 90 to shaft 30. The rotation of gear 36 is transmitted through shafts 26 and 88 to elliptical gear 100. Elliptical gear 100 meshing with elliptical gear 98 on shaft 86 transmits rotation thereto in the 1:1 ratio so that shaft 86 makes one revolution per revolution of shaft 88. Gear 96 secured to shaft 86 drives gear 94 on shaft 84. The ratio between gears 96 and 94 is 1:2 so that shaft 84 makes one revolution for two revolutions of shaft 86. Thus the gear 36 must make two revolutions for each revolution of shaft 30 and crankshaft 46 so that the spring feeders 58 reciprocate once for each two revolutions of printing cylinder 14. This is commonly referred to as skip feed. Because of the elliptical shape of gears 100 and 98 there is a variable velocity ratio throughout a revolution of gears 100 and 98. The elliptical gears 100 and 98 are so arranged that the spring feeder 58 approaches board speed or maximum velocity as the box blank is frictionally engaged by the pinch rolls and fed to the printing cylinder. In FIGURE 8 curve C is a velocity curve for skip feed. FIGURE 8 illustrates that the maximum velocity of the blank is attained once during two revolutions of the printing cylinder.

The manner in which the housing 24 is secured to the subframe 22 and the manner in which the housing 24 is rotated to align shafts 84 and 88 with shafts 26 and 30 for double feeding and to align shafts 88 and 84 with shafts 26 and 30 for skip feeding is not illustrated in detail. It should be understood, however, that any suitable means for rotating the housing 24 about the axis of shaft 28 in the main transmission would be suitable.

FIGURES 5 and 6 are schematic views in elevation of the gearing in the auxiliary transmission and illustrate respectively the relative position of the gearing for double feed and skip feed. In FIGURE 5 large gear 94 is at the left extremity of the auxiliary transmission and meshes with gear 96. The elliptical gear 100 is drivingly connected to the link member 50 to advance and retract the spring feeder 58. The arrangement of elliptical gears 98 and 100 as illustrated in FIGURE 5 provides a peak velocity for the box blank when the box blank enters the pinch rolls for frictional engagement thereby. FIGURE 6 illustrates the auxiliary transmission rotated through 180° so that elliptical gear 100 is driven by a shaft 26. The link 50 is driven by gear 94 through shaft 30. Because of the previously described ratios of gears 94 and 96, two revolutions of gears 100 and 98 result in a single revolution of gear 94 to provide skip feed. The variable velocity ratio of the elliptical gears 98 and 100 provide a peak velocity for the box blank as the box blank enters the pinch rolls, as desired. FIGURE 7 is a schematic diagram of the main transmission that provides a regular feed for the spring feeder 58.

FIGURES 9, 10 and 11 are diagrammatic representations of a similar gearing arrangement associated with a different type of crank mechanism. The mechanism schematically illustrated in FIGURES 9, 10 and 11 utilizes a yoke mechanism that replaces the lever 52, and the pin 54 in this alternate embodiment has a bearing thereon that is positioned within the yoke and causes the yoke and the crankshaft 56 to reciprocate as the crank drive 46 revolves. The gearing arrangement in FIGURES 9, 10 and 11 is similar to the gearing arrangement illustrated in FIGURES 5, 6 and 7.

FIGURE 12 graphically illustrates the velocities of the box blanks with this alternate embodiment. Curve D is the velocity curve for regular feed, curve E, for double feed, and curve F, for skip feed. Curves D, E and F are similar to curves A, B, C and D illustrated in FIGURE 8.

The auxiliary transmission within the housing 24 is frictionally engaged to the main transmission through the clutches 90 and 92. In order to obtain the peak velocities at the desired times, as previously discussed, it is necessary to have the elliptical gears 98 and 100 properly positioned relative to the gears in the main transmission. To accomplish the proper positioning of the elliptical gears 98 and 100 when either skip feed or double feed is desired, a timing means is provided on certain of the gears and shafts and associated framework. In FIGURES 13 and 14 there are indicating timing buttons for properly positioning the gears and the spring feeder to attain the desired peak velocities. A timing button 102 is fixed to the gear 34 that is rotatable with the printing cylinder 14. Another timing button 104 is secured to the machine frame 12 opposite the button 102. The slide 62 has a timing button 106 affixed thereto at the position where the slide 62 should assume peak velocity. A corresponding timing button 108 is fixed to the bed 110 of the machine. When the timing buttons 102, 104 and the timing buttons 106 and 108 are matched, the spring feeder 58 is in proper timed relation with the printing cylinder 14 and also with the crank gear 36. After the printing cylinder 14 and slide 62 are properly matched, the elliptical gears 98 and 100 are positioned as shown in FIGURE 13 so that the desired peak velocity is obtained. FIGURE 13 illustrates the housing 24 positioned in the double feed position. A timing button 112 is fixed to the end of shaft 86 and a corresponding timing button 114 is fixed to the housing 24 opposite the button 112. The shaft 86 may be provided with a square end portion 116 for receiving a lever or the like. When all of the timing buttons are matched, the mechanism is timed properly. The elliptical gears 98 and 100 are timed with the clutches 90 and 92 disengaged. After the timing buttons 112 and 114 are matched, the clutches 90 and 92 are engaged to provide for double feed, as illustrated in FIGURE 13.

According to the provisions of the patent statutes, the principle, preferred construction, and mode of operation of the invention have been explained, and what is now considered to represent its best embodiment has been illustrated and described. However, it should be understood that within the scope of the appended claims the invention may be practiced otherwise than as specifically illustrated and described.

I claim:

1. Apparatus for feeding box blanks at three timed frequencies with adjacent processing machinery comprising, a reciprocating feeder for feeding box blanks successively from a stack to adjacent processing machinery, an output shaft connected to said reciprocating feeder and operable upon rotation to reciprocate said feeder, an input shaft connected to and driven by said adjacent processing machinery in timed relation thereto, a primary transmission operable to connect said input shaft to said output shaft for reciprocating said feeder at a first timed frequency relative to adjacent processing machinery, an auxiliary transmission operable in a first position to connect said input shaft to said output shaft for reciprocating said feeder at a second timed frequency relative to said processing machinery and in a second position to connect said input shaft to said output shaft for reciprocating said feeder at a third timed frequency relative to said processing machinery, and said primary and auxiliary transmissions constructed and arranged so that in all of said frequencies said reciprocating feeder feeds box blanks into the adjacent processing machinery at a linear velocity substantially equal to the peripheral velocity of a rotating member in said adjacent processing machinery.

2. Apparatus for feeding box blanks at three timed frequencies with adjacent processing machinery as set forth in claim 1 in which,
said primary transmission includes a housing rotatably supporting said input shaft, said output shaft and an intermediate shaft,
meshing spur gears connecting said input shaft to said intermediate shaft and said intermediate shaft to said output shaft, and
said spur gears having a ratio relationship so that the frequency of said output shaft is substantially equal to the frequency of said input shaft.

3. Apparatus for feeding box blanks at three timed frequencies with adjacent processing machinery as set forth in claim 1 in which,
said primary transmission includes a housing rotatably supporting said input shaft, said output shaft and an intermediate shaft,
meshing spur gears connecting said input shaft to said intermediate shaft and said intermediate shaft to said output shaft, and
said intermediate shaft being movable longitudinally in said housing to disengage said spur gears connecting said input shaft and said output shaft.

4. Apparatus for feeding box blanks at three timed frequencies with adjacent processing machinery as set forth in claim 1 in which,
said auxiliary transmission includes a pair of meshing elliptical gears operable to vary the peripheral velocity of said output shaft and thereby vary the linear velocity of said reciprocating feeder so that in both said first position and said second position of said auxiliary transmission said reciprocating feeder feeds box blanks into said adjacent processing machinery at a linear velocity substantially equal to the peripheral velocity of a rotating member in said adjacent processing machinery.

5. Apparatus for feeding box blanks at three timed frequencies with adjacent processing machinery as set forth in claim 1 in which,
said auxiliary transmission includes gearing operable in said first position to rotate said output shaft at twice the frequency of said input shaft and in a second position to rotate said output shaft at one-half the frequency of said input shaft.

6. Apparatus for feeding box blanks at three timed frequencies with adjacent processing machinery as set forth in claim 1 in which,
said auxiliary transmission includes a housing,
first, second and third shafts rotatably mounted in said housing in spaced parallel relation to each other,
a pair of meshing spur gears having a 2:1 ratio secured to said first and second shafts respectively,
a pair of meshing elliptical gears having a 1:1 ratio secured to said second and third shafts, and
clutch means operable to engage said first shaft to said input shaft and said third shaft to said output shaft in said first position and said third shaft to said input shaft and said first shaft to said output shaft in said second position.

7. Apparatus for feeding box blanks at three timed frequencies with adjacent processing machinery comprising,
a reciprocating feeder for feeding box blanks successively from a stack to adjacent processing machinery,
an output shaft connected to said reciprocating feeder and operable upon rotation to reciprocate said feeder,
an input shaft connected to and driven by said adjacent processing machinery at the same frequency as a rotating member in said adjacent processing machinery,
a primary transmission operable to connect said input shaft to said output shaft for reciprocating said feeder at substantially the same frequency as said rotating member in said adjacent processing machinery,
means to disengage said primary transmission from said output shaft,
an auxiliary transmission operable in a first position to connect said input shaft to said output shaft for rotating said output shaft at twice the frequency of said input shaft and in a second position to connect said input shaft to said output shaft for rotating said output shaft at one-half the frequency of said input shaft, and
said auxiliary transmission including means for transmitting rotation to said output shaft at a variable peripheral velocity so that the linear velocity of said reciprocating feeder is substantially equal to the peripheral velocity of said rotating member in said adjacent processing machinery as said reciprocating feeder feeds box blanks into said adjacent processing machinery at any one of said three timed frequencies.

8. Apparatus for feeding box blanks at three timed frequencies with adjacent processing machinery as set forth in claim 7 in which,
said primary transmission includes a housing rotatably supporting said input shaft, said output shaft and an intermediate shaft,
meshing spur gears connecting said input shaft to said intermediate shaft and said intermediate shaft to said output shaft,
said intermediate shaft movable longitudinally in said housing to disengage said spur gears connecting said input shaft to said output shaft, and
said spur gears having a ratio relationship so that the frequency of said output shaft is substantially equal to the frequency of said input shaft.

9. Apparatus for feeding box blanks at three timed frequencies with adjacent processing machinery as set forth in claim 7 in which,
said auxiliary transmission includes a housing,
first, second and third shafts rotatably mounted in said housing in parallel spaced relation to each other,
a pair of meshing spur gears having a 2:1 ratio secured to said first and second shafts,
a pair of meshing elliptical gears having a 1:1 ratio secured to said second and third shafts, and
clutch means operable to engage said first shaft to said input shaft and said third shaft to said output shaft in said first position and said third shaft to said input shaft and said first shaft to said output shaft in said second position.

10. Apparatus for feeding box blanks at three timed frequencies with adjacent processing machinery as set forth in claim 9 which includes,
indicating means to position said input and output shafts relative to said rotating member of said adjacent processing machinery and said reciprocating feeder so that upon engagement of said clutch means said elliptical gears are positioned to impart a linear velocity to said box blanks that is substantially equal to the peripheral velocity of said rotating member in said adjacent processing machinery as said box blanks are fed to said adjacent processing machinery.

11. A machine for printing box blanks comprising a rotatable printing cylinder having a fixed circumference and means for bringing a blank into engagement with said cylinder in time relation of the rotation of said cylinder, said last-named means including means for feeding a blank whose length is equal to the circumference of said cylinder, means for feeding a blank whose length is less than the circumference of said cylinder, means for feeding a blank whose length is greater than the circumference of said cylinder, and means for selecting one of said feeding means.

12. A machine for printing box blanks comprising a rotatable printing cylinder having a fixed circumference, a support for supporting a plurality of box blanks in a stationary position, and means for supplying a single blank at a time into engagement with said printing cylinder in timed relation to the rotation of said cylinder, said last-named means including means for feeding a blank having a length equal to the circumference of said cylinder, means for feeding a box blank having a length greater than the circumference of said printing cylinder, means for feeding a blank having a length less than the circumference of said cylinder, means for selecting one of said feeding means to be operative, and means for accelerating said blank from a stationary position to a lineal velocity at the time engagement with said cylinder is equal to the peripheral velocity of said cylinder.

References Cited by the Examiner
UNITED STATES PATENTS 2,181,211  11/1939  Sieg _____ 271—44 X SAMUEL F. COLEMAN, *Primary Examiner.*